(12) United States Patent
Lo

(10) Patent No.: US 6,193,255 B1
(45) Date of Patent: Feb. 27, 2001

(54) TREAD ROD OF ACROBATIC BICYCLE

(76) Inventor: Wo Rong Lo, No. 720, Wen Chiu Rd., Ta-Chia Chen, Taichung Hsien (TW)

( * ) Notice: Subject to any disclaimer, the term of this patent is extended or adjusted under 35 U.S.C. 154(b) by 0 days.

(21) Appl. No.: 09/185,067

(22) Filed: Nov. 2, 1998

(51) Int. Cl.$^7$ .................................................. B62J 25/00
(52) U.S. Cl. ............................................ 280/291; 74/564
(58) Field of Search ................................ 280/288.4, 291, 280/293, 279; 74/564, 566, 562

(56) References Cited

U.S. PATENT DOCUMENTS

| | | | | |
|---|---|---|---|---|
| 450,907 | * | 4/1891 | Blakely | 280/291 |
| 615,533 | * | 12/1898 | Demory | 280/291 |
| 625,368 | * | 5/1899 | Thompson | 280/291 |
| 3,484,829 | * | 12/1969 | Erickson | 280/291 |
| 3,800,396 | * | 4/1974 | Puchner | 411/368 |
| 4,771,651 | * | 9/1988 | Haro | 280/291 |
| 5,482,207 | * | 1/1996 | Lin | 74/564 |

FOREIGN PATENT DOCUMENTS

236416 * 7/1925 (GB) .

* cited by examiner

*Primary Examiner*—J. J. Swann
*Assistant Examiner*—Christopher Bottorff
(74) *Attorney, Agent, or Firm*—W. Wayne Liauh

(57) ABSTRACT

A tread rod is fastened with a bicycle front fork by a fastening bolt and a nut. The fastening bolt has a threaded shank and a head. The nut is of a hexagonal construction and is provided with an inner threaded hole engageable with the threaded shank of the fastening bolt. The nut is securely located in a hexagonal hole of the inner end of a connection tube which is fastened with the bicycle front fork. The tread rod is fastened with the outer end of the connection tube by the fastening bolt such that the threaded shank of the fastening bolt is engaged with the inner threaded hole of the nut via a center hole of the fastening end of the tread rod and an axial through hole of the connection tube.

3 Claims, 4 Drawing Sheets

TREAD ROD OF ACROBATIC BICYCLE

FIELD OF THE INVENTION

The present invention relates generally to an acrobatic bicycle, and more particularly to a tread rod assembly affixed to the acrobatic bicycle.

BACKGROUND OF THE INVENTION

As shown in FIG. 1, a bicycle tread rod 30 of the prior art is fastened with a front fork 10 of the bicycle and is intended for use in allowing a person to step on it for performing an acrobatic feat. The front fork 10 is provided at the lower end thereof with a horizontal threaded tube 20 having an inner threaded hole 201. The tread rod 30 is provided with an outer threaded portion 301 which is engaged with the inner threaded hole 201.

Such a tread rod of the prior art as described above is defective in design in that the outer threaded portion 301 of the tread rod 30 is vulnerable to damage or even severance caused by the stress that is concentrated at the portion indicated by an arrow "A" at such time when a person steps on the tread rod 30. In addition, it is rather difficult to take the severed outer threaded portion 301 out of the inner threaded hole 201.

SUMMARY OF THE INVENTION

The primary objective of the present invention is to provide bicycle with an improved tread rod free from the drawbacks of the prior art tread rod.

In keeping with the principle of the present invention, the foregoing objective of the present invention is attained by the bicycle tread rod consisting of a tubular rod having a closed end and an open end. The closed end of the tread rod is fastened with a horizontal connection tube of the bicycle front fork in conjunction with a bolt and a nut.

The foregoing objective, features, functions, and advantages of the present invention will be more readily understood upon a thoughtful deliberation of the following detailed description of a preferred embodiment of the present invention with reference to the accompanying drawings.

DETAILED DESCRIPTION OF THE EMBODIMENT

Figure 1:
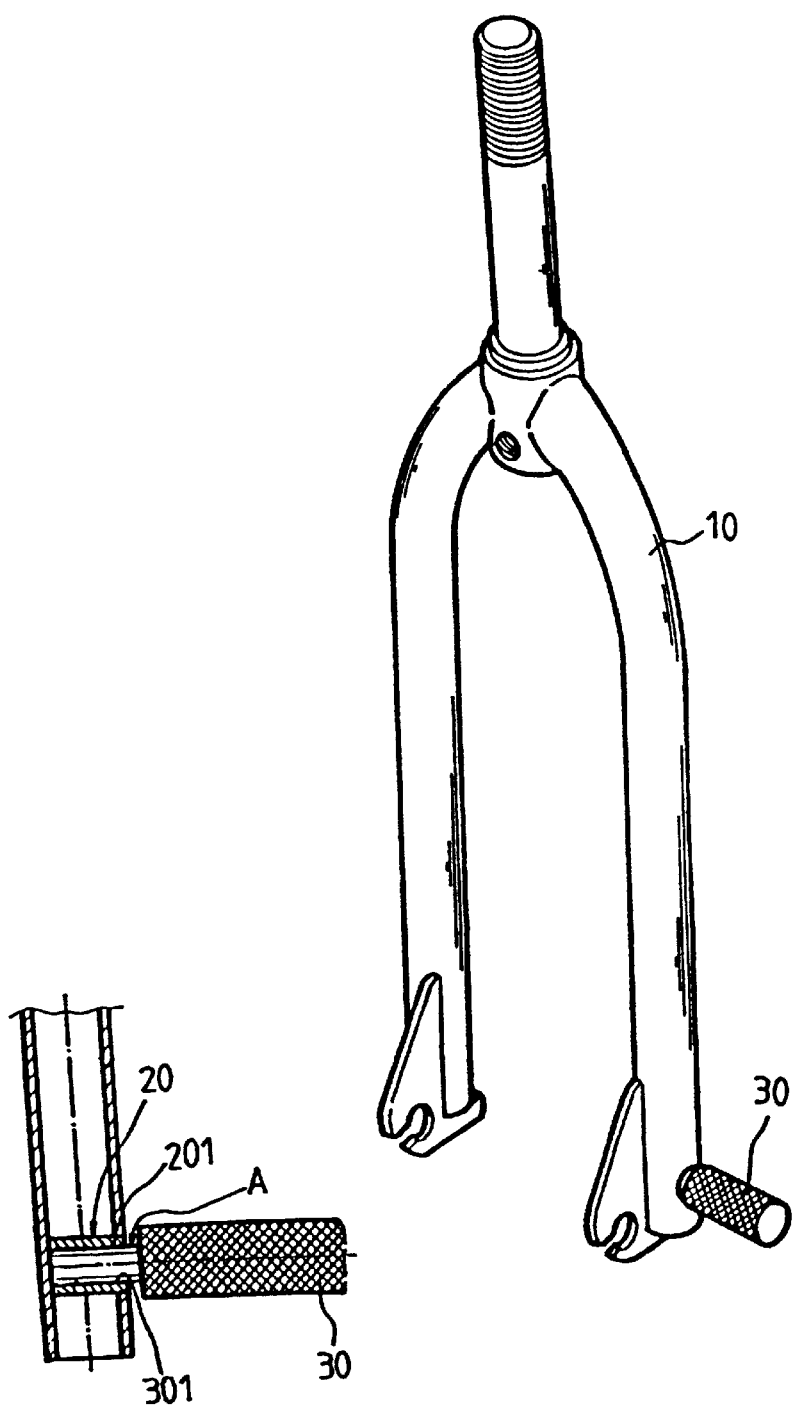
FIG. 1 shows a schematic view of a bicycle tread rod of the prior art.
Figure 2:
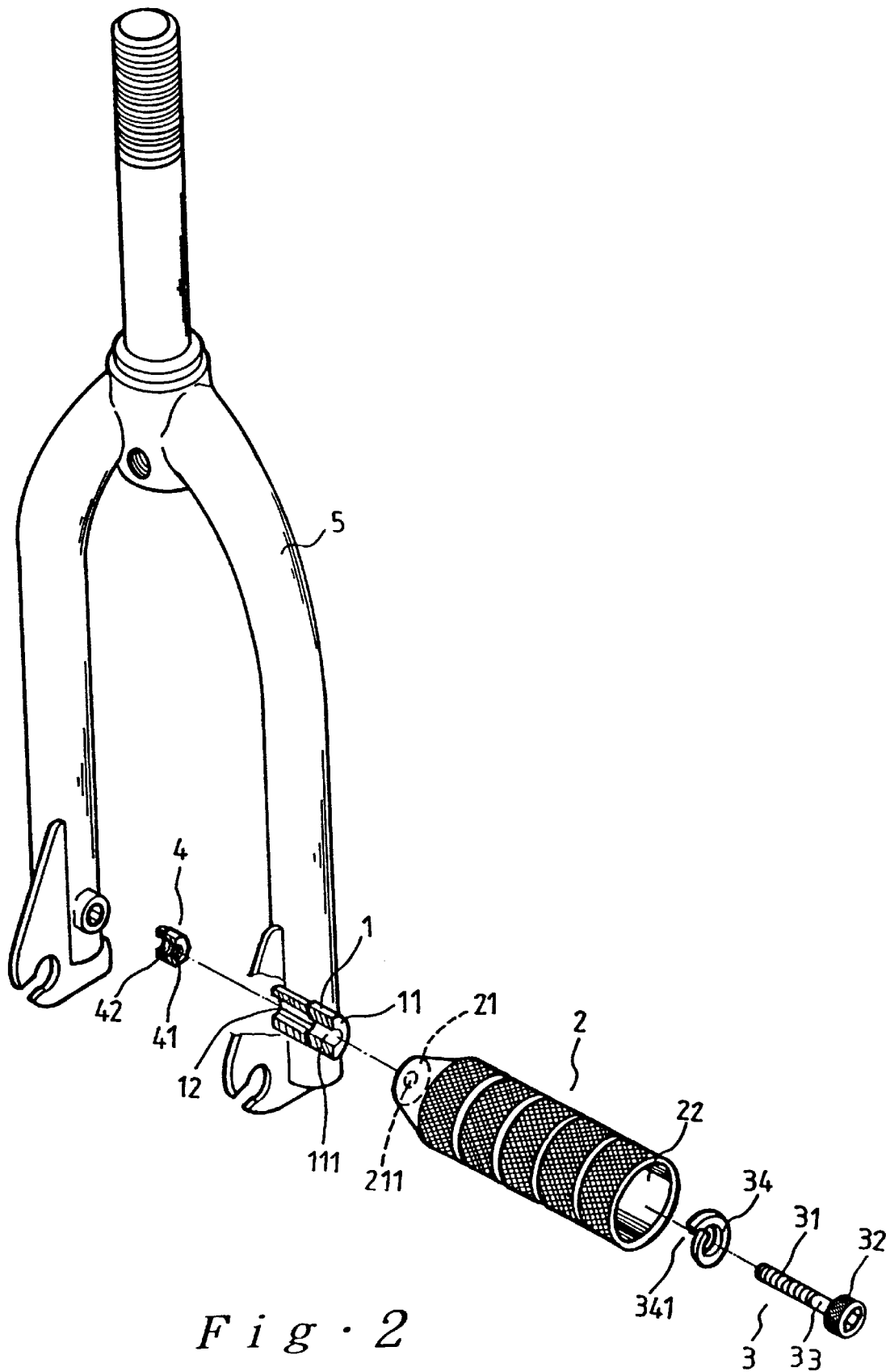
FIG. 2 shows an exploded view of a bicycle tread rod of the present invention.
Figure 3:
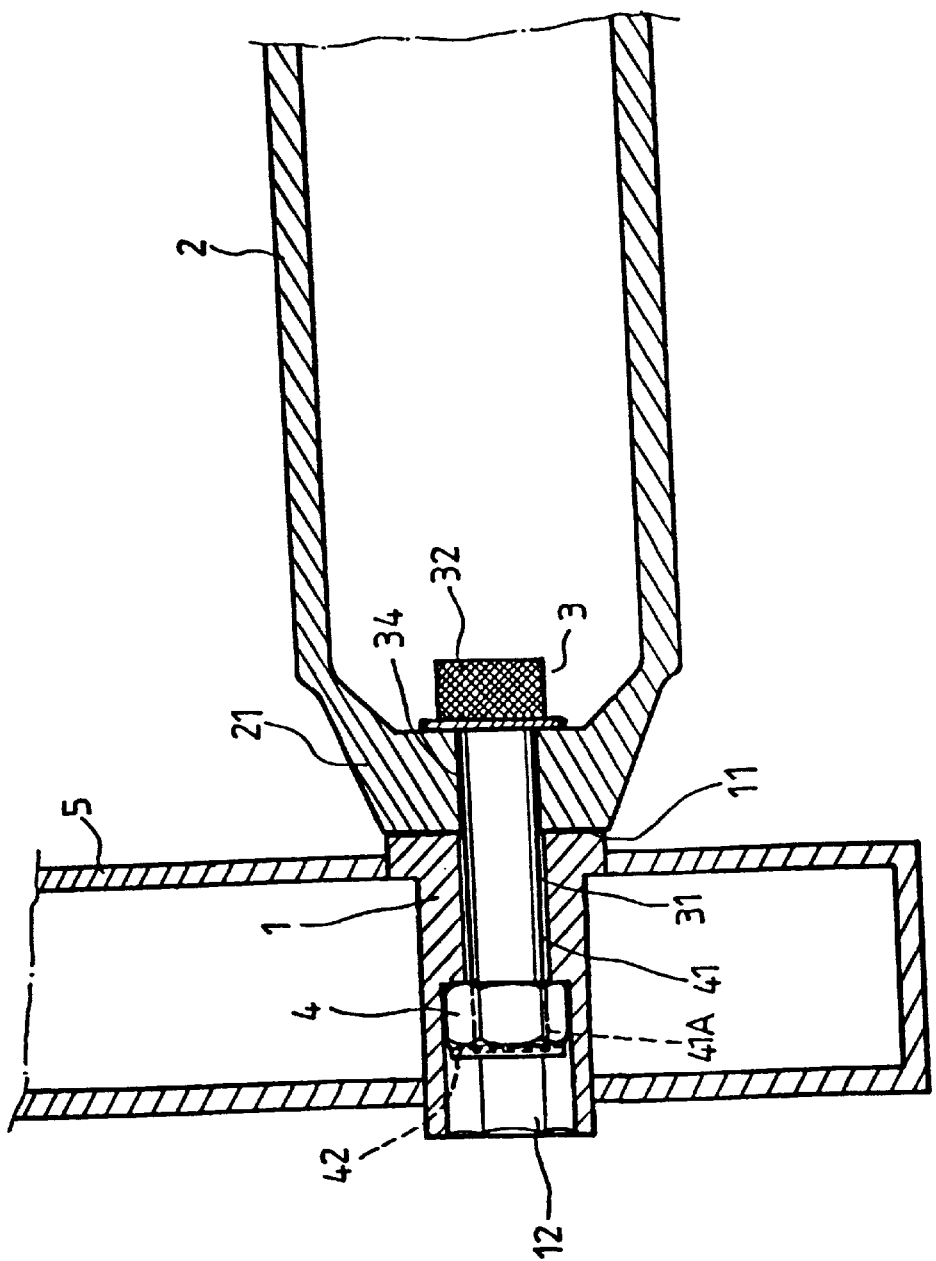
FIG. 3 shows a sectional view of the present invention along with a bicycle front fork.
Figure 4:
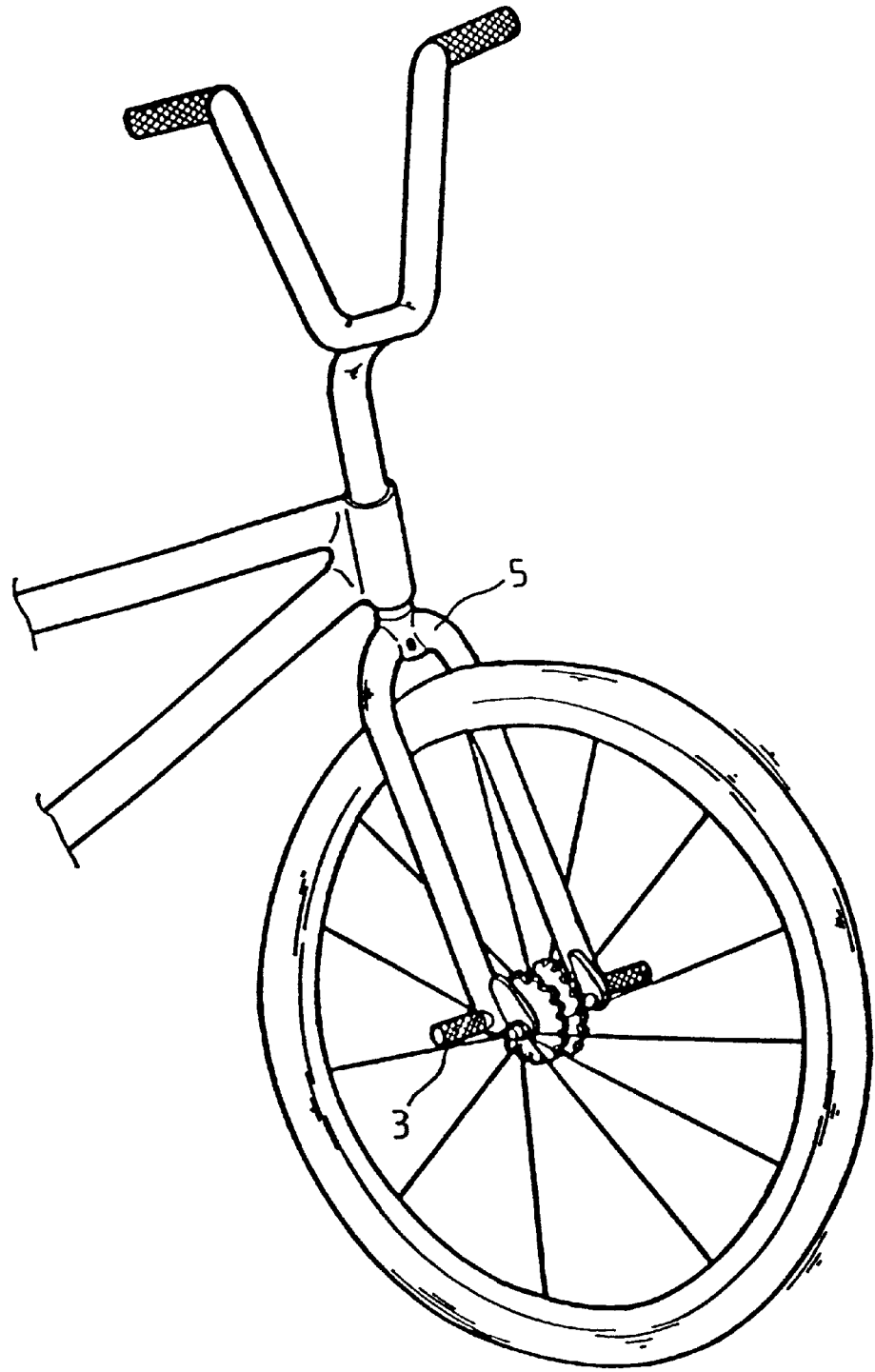
FIG. 4 shows a schematic view of the present invention along with a bicycle front wheel.

As shown in FIGS. 2–4, a tread rod 2 embodied in the present invention is fastened with a bicycle front fork 5 in conjunction with a fastening bolt 3 and a nut 4.

The bicycle front fork 5 is provided at the lower end thereof with a connection tube 1 of a hollow construction. The connection tube 1 is provided at the outer end thereof with a connection surface 11 which is provided with an axial through hole 111. The connection tube 1 is provided at the inner end thereof with a hexagonal hole 12.

The tread rod 2 of a hollow tubular construction is provided with a fastening end 21 and a free end 22. The fastening end 21 is closed and provided with a center hole 211. The free end 22 is open.

The fastening bolt 3 has a threaded shank 31, a head 32, and a smooth portion 33 located between the shank 31 and the head 32. An elastic ring 34 is fitted over the smooth portion 33 and is provided with a cut 341.

The nut 4 is of a hexagonal construction and is provided with an inner threaded section 41 having an inner threaded hole 41A in which a ring 42 is provided.

In combination, the fastening bolt 3 is put into the tread rod 2 from the open end 22 of the tread rod 2 such that the shank 31 of the bolt 3 is jutted out of the fastening end 21 via the center hole 211, and that the threaded shank 31 of the bolt 3 is engaged with the inner threaded hole 41A of the inner threaded section 41 of the nut 4 which is located securely in the hexagonal hole 12 of the connection tube 1 of the front fork 5. The fastening bolt 3 can be advanced to engage securely the nut 4 by a hand tool, which is used to turn the head 32 of the fastening bolt 3.

In light of the fastening end 21 of the tread rod 2 making contact with the connection surface 11 of the connection tube 1, the stress exerting on the tread rod 2 is effectively dispersed to the connection tube 1 and the front fork 5. As a result, the stress exerting on the fastening bolt 3 is greatly reduced to minimize the incident of the deformation or severance of the fastening bolt 3. As the tread rod 2 is under the moment of torsion and the shearing force, the fastening bolt 3 is securely engaged with the nut 4, thanks to the ring 42 which is retained on the threaded shank 31 of the fastening bolt 3.

In view of the fact that the fastening bolt 3 is not engaged with the connection tube 1, the fastening bolt 3 can be easily taken out of the connection tube 1 in the event that the fastening bolt 3 is damaged or severed.

The embodiment of the present invention described above is to be deemed in all respects as being merely illustrative and not restrictive. Accordingly, the present invention may be embodied in other specific forms without deviating from the spirit thereof. The present invention is therefore to be limited only by the scopes of the following appended claim.

What is claimed is:

1. A tread rod assembly connected to a front fork of an acrobatic bicycle, comprising:
   (a) a cylindrical tread rod having an open free end and a tapered fastening section opposite said open free end, said tapered fastening section terminating with a closed end face having a center hole;
   (b) a connection tube provided at a lower end of a front fork of a bicycle, said connection tube having an outer section with a cylindrical hole and an inner section with a hexagonal hole, said outer section of said connection tube having an outer end face matching and flush with said closed end face of said tapered fastening section of said cylindrical tread rod;
   (c) a hexagonal nut received in said hexagonal hole of said inner section of said connection tube, said hexagonal nut having an internal thread;
   (d) a fastening bolt for fastening said cylindrical tread rod to said connection tube, said fastening bolt having a threaded shank and a head, said threaded shank being dimensioned so that it can be inserted through said center hole of said fastening end of said tubular rod and received by said internal thread of said hexagonal nut;

(e) wherein said closed end face of said cylindrical tread rod is tightly fastened against said outer end face of said connection tube by turning said head of said fastening bolt.

2. The tread rod as defined in claim 1, wherein said fastening bolt is provided with a smooth portion located between said threaded shank and said head; and wherein said fastening bolt is provided with an elastic ring located at said smooth portion.

3. An acrobatic bicycle comprising a front fork and a tread rod assembly connected to said front fork, said tread rod assembly comprising:

(a) a cylindrical tread rod having an open free end and a tapered fastening section opposite said open free end, said tapered fastening section terminating with a closed end face having a center hole;

(b) a connection tube provided at a lower end of a front fork of a bicycle, said connection tube having an outer section with a cylindrical hole and an inner section with a hexagonal hole, said outer section of said connection tube having an outer end face matching and flush with said closed end face of said tapered fastening section of said cylindrical tread rod;

(c) a hexagonal nut received in said hexagonal hole of said inner section of said connection tube, said hexagonal nut having an internal thread;

(d) a fastening bolt for fastening said cylindrical tread rod to said connection tube, said fastening bolt having a threaded shank and a head, said threaded shank being dimensioned so that it can be inserted through said center hole of said fastening end of said tubular rod and received by said internal thread of said hexagonal nut;

(e) wherein said closed end face of said cylindrical tread rod is tightly fastened against said outer end face of said connection tube by turning said head of said fastening bolt.

* * * * *